June 4, 1940.  E. O. YOUNG  2,203,120
DAMFER CONTROL
Filed Oct. 23, 1937  2 Sheets-Sheet 1

Inventor
EMIL O. YOUNG.
By Robert Cobb
Attorneys

June 4, 1940.　　　　　E. O. YOUNG　　　　　2,203,120

DAMPER CONTROL

Filed Oct. 23, 1937　　　　2 Sheets-Sheet 2

Inventor

EMIL O. YOUNG

By Robb & Robb

Attorneys

Patented June 4, 1940

2,203,120

UNITED STATES PATENT OFFICE 2,203,120

DAMPER CONTROL

Emil O. Young, Cleveland, Ohio

Application October 23, 1937, Serial No. 170,681

4 Claims. (Cl. 98—106)

This invention relates to damper control means for controlling the passage of air through a duct, and has for an object the provision of means associated with a damper for positively locking the damper in varied positions of adjustment.

A further object is the provision of means associated with the damper for minimizing or eliminating vibrations of the damper which may be caused by the passage of currents of air through the duct.

A still further object of the invention is the accomplishment of the locking and vibration eliminating functions through the instrumentalities of a single means, or by the association of separate means.

In carrying out my invention, I provide instrumentalities for operating the damper comprising gearing means operating in such a manner as to lock the damper in any of its various positions of adjustment in the duct and by so locking it minimizing vibration of the damper normally caused by currents of air in their passage through the duct.

I further provide means associated with the damper, and separate from the operating instrumentalities above mentioned, for frictionally engaging the walls of the duct in a yieldable manner, whereby when the damper is adjusted to one of its various positions, the frictional engagement of the yieldable means with the walls of the damper serves both to tend to maintain the damper in the desired position of adjustment, and also to eliminate vibration of the damper which might otherwise be caused by air currents in the duct.

The invention is now to be more particularly described in conjunction with the drawings, in which.

Figure 3:
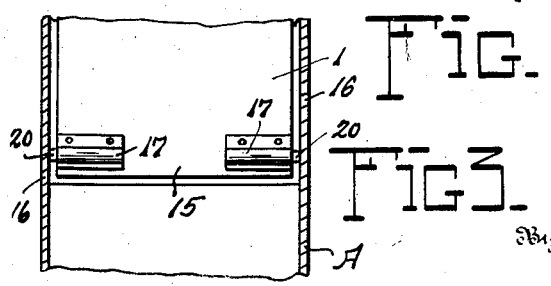

Figure 3 ilustrates a dual set of frictional engaging means associated with the damper in engagement with the walls of the duct.

Figure 1:
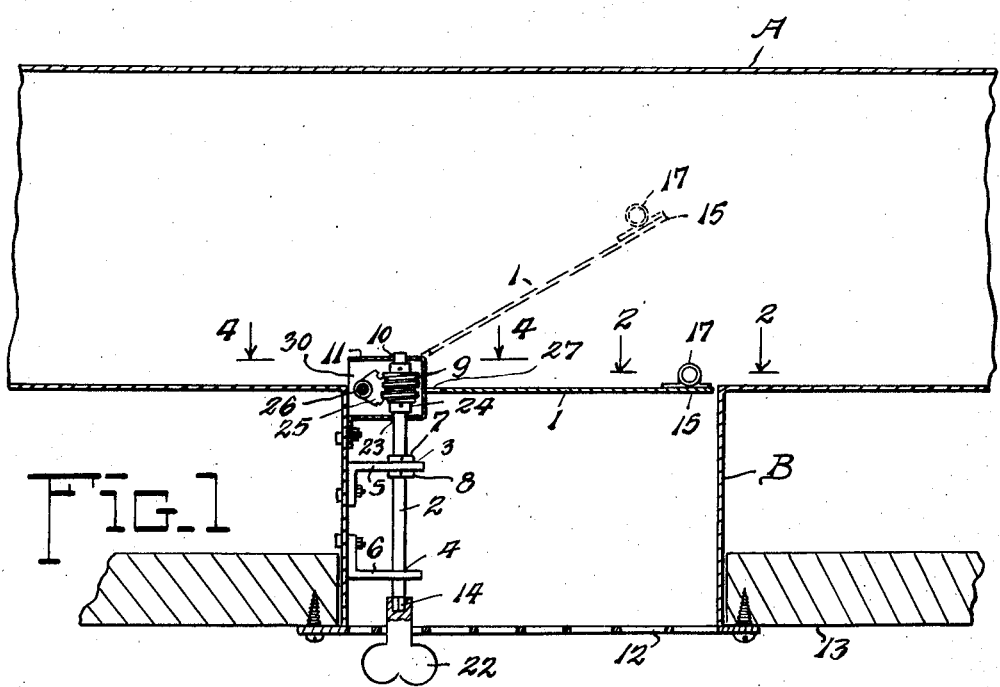
Figure 1 is a sectional view through a duct showing the arangement of the damper control therein.
Figure 2:
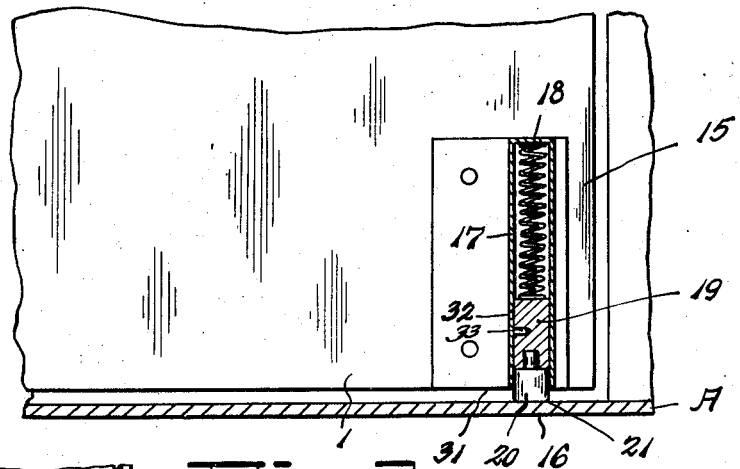
Figure 2 is a view partially broken away, showing the yieldable frictionally engaging means on the damper in one of its positions of engagament with the wall of the duct.
Figure 4:
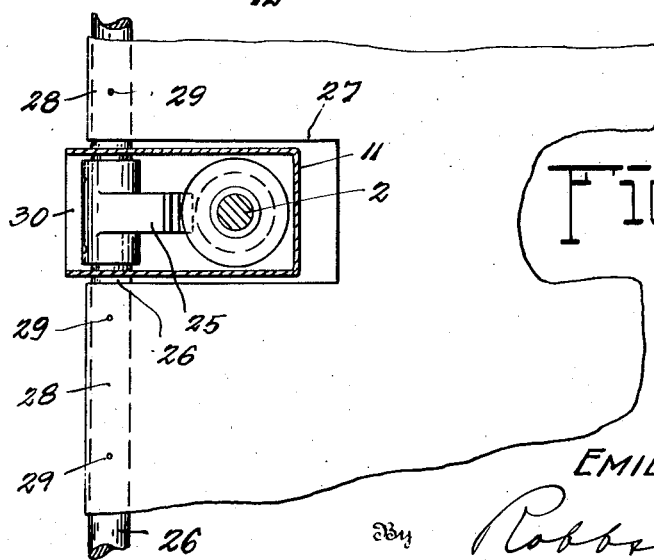

Figure 4 is a view on the line 4—4 of Figure 1 showing relation of sector gear and worm.

Figure 5:
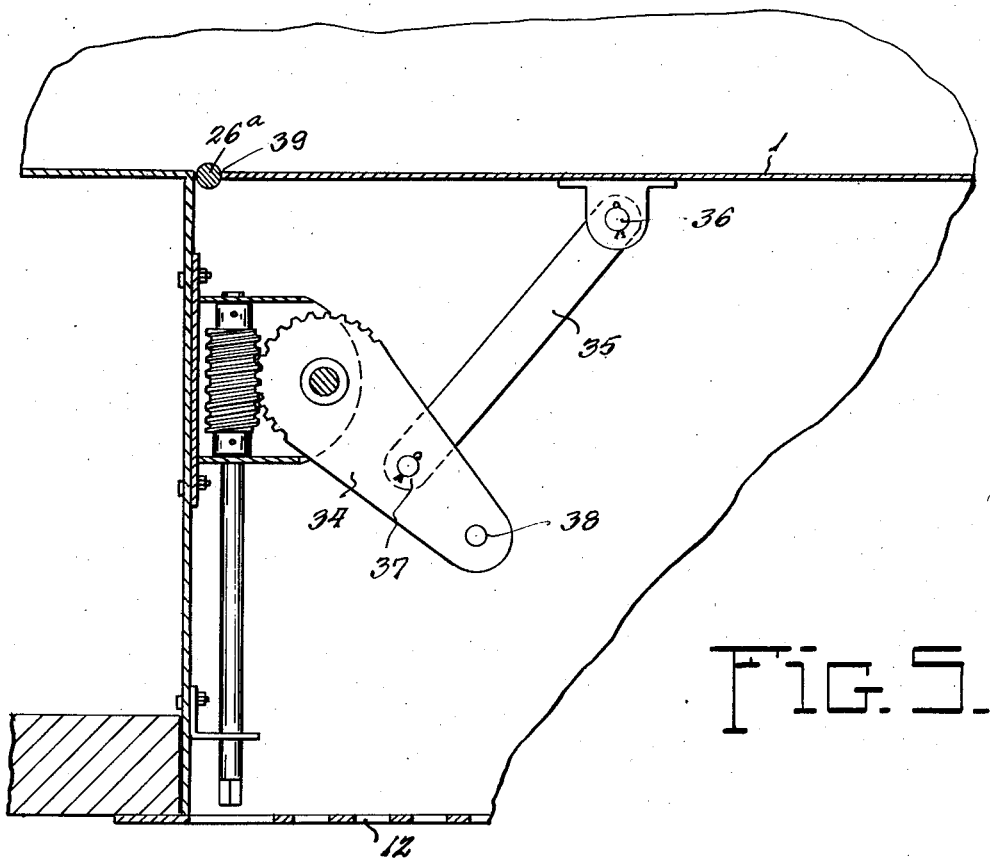

Figure 5 is a sectional view through a duct showing a modification of the invention.

Referring first more particularly to Figure 1, A illustrates a main duct, and B illustrates a branch duct, the flow of air coming into which from the main duct is adapted to be controlled by the damper 1.

Positioned in the branch duct B are the damper operating means, comprising a shaft 2 journaled in bearings 3 and 4 of brackets 5 and 6 respectively, and also journaled in openings 10 and 23 of the housing 11. Collars 7 and 8 locked to the shaft 2 by set screws, and abutting with either side of bracket 5, maintain the shaft in proper position. At the inner end of the shaft 2 is a worm 9 having a sleeve 24 which is locked to shaft 2 by a set screw. Worm 9 is adapted to cooperate with a sector worm gear 25, mounted upon shaft 26. The employment of bracket 5 and collars 7 and 8 is of course optional where a sleeve worm such as 9—24 and housing such as 11 are utilized. The ends of shaft 26 are journaled in openings in the walls of main duct A.

Sector gear 25, and damper 1, are rigidly connected to shaft 26, and adapted to move therewith. As seen best in Figure 4, damper 1 has a cut-out portion as at 27. The end portions 28—28 at either side of the cut-out portion are folded back upon themselves in a manner to provide sleeve-like hinge portions through which shaft 26 may pass. Pins 29—29 inserted through end portions 28 and shaft 26 serve to interconnect damper and shaft in a rigid manner. A grill such as illustrated at 12 covers the outlet opening of the branch duct B, and said grill may be secured to the floor or wall 13, as is common in employment of hot air registers.

The outer end 14 of the shaft 2 is formed so as to cooperate with a key 22 which may be inserted through the grill for its operation in practice. The shaft 2 is positioned opposite an opening of the grill. It will be seen from the foregoing that when the shaft 2 is rotated in the manner described, it will operate through the worm 9, and sector gear 25, to move the damper 1 to desired positions of adjustment, either for closing the branch duct B or opening said branch duct for the admission of the desired amount of air thereinto.

In view of the fact that the shaft 2 can not be rotated except by manipulation of the key in conjunction with the end 14 thereof, because of the locking action of the worm 9 in engagement with the sector gear 25, it will be seen that the damper 1 when once positioned by rotation of the said shaft 2 will remain in such position. Also, because of locking action of the worm 9 and sector gear 25, the damper 1 will tend to be maintained against vibration which might otherwise be caused by the currents of air in the main duct A.

No matter how rigidly the damper 1 at its inner end may be maintained in position by the locking action above described, the air currents in the main duct A will tend to cause vibration of the damper on account of the pressure of such air currents at the outer end 15 of said damper, unless means are provided for overcoming this tendency.

My invention makes provision for maintenance of the outer end 15 of the damper 1 in yieldable frictional engagement with the wall 16 of the main duct A. The means whereby this is accomplished is now to be described.

Mounted at either side and preferably at both sides of the outer end 15 of the damper 1 is a unit comprising a sleeve 17 having positioned therein a compression spring 18 to which is attached a plunger 19 having suitably secured thereto a friction block or shoe 20.

The friction block or shoe 20 may be formed of any suitable material such as wood or rubber, and frictionally engages a wall 16 of the duct A, as at 21, being compelled against the wall 16 by the springs 18 with sufficient pressure so as to tend to maintain the damper in a desired position within the duct A, yet permitting variation of such positioning through the means previously described.

The construction of my invention above described has been designed with a view to simplicity and facility of assemblage.

In assembling the operating parts, sleeve-worm 9—24 and worm gear 25 may be placed in the housing 11 through rear opening 30 thereof and shafts 2 and 26 as well as damper 1 assembled in operative relation thereto in an obvious manner.

In placing the assembled damper and operating mechanism within the said main duct provision is made for the maintenance of the outer end of shoe 20 flush with the edge 31 of the damper during such operation. For this purpose, sleeve 17 is provided with an opening 32 and plunger 19 with a recess 33 such that when 32 and 33 register the outer end of shoe 20 will be flush with edge 31 of damper 1 and a pin inserted in 32—33 will maintain it so. After the damper and operating mechanism are properly placed in the main duct A the pin will, of course, be withdrawn, to permit the intended functioning of the spring pressed plunger device.

Figure 5 illustrates a modified construction of the invention wherein a worm gear lever 34 is utilized in place of the sector gear of Figures 1–4. A link 35 is pivotally connected to damper 1 as at 36 and to worm gear lever 34 either in the position shown at 37 or the alternative position as at 38, depending on the degree of swing of damper 1 required. This construction enables damper 1 to be permanently secured to shaft 26a as at 39 by welding or otherwise and independently of the assemblage of the operating parts.

Having thus described my invention, what I claim as new and desire to secure by Letters Patent of the United States, is:

1. In a damper control of the class described, in combination, an air duct, a pivotal damper having a fixed axis for controlling the passage of air therethrough, operating means comprising locking instrumentalities disposed adjacent to the axis of the damper for maintaining the damper in varied positions of adjustment, and auxiliary means associated with the free edge of said damper for yieldably engaging the walls of said duct, whereby to minimize vibration of the damper caused by air currents in the duct.

2. In a damper control of the class described, in combination, a main duct, a branch duct connected therewith and having an outlet opening, a grill covering said opening, damper operating instrumentalities positioned in said branch duct and comprising brackets attached to the walls of said branch duct, a shaft rotatably supported by said brackets, the outer end of said shaft being positioned opposite one of the openings of said grill and being adapted to cooperate with a key inserted through said grill from the outside, a worm associated with the inner end of said shaft and operable by rotation thereof, and a worm gear cooperating with said worm, and a damper movable with said worm gear within the main duct and operable for controlling the passage of air into the branch duct.

3. In a damper control of the class described, a damper for controlling the passage of air through a duct, operating means associated with said damper for shifting the damper to varied positions of adjustment, and adjustable means associated with said operating means whereby the latter means may be caused to produce a greater or less degree of movement in the damper, said operating means comprising a cooperating worm and worm gear lever, and said adjustable means comprising means for varying the effective length of the worm gear lever and operatively connecting the same to the damper.

4. In a damper control of the class described, a damper for controlling the passage of air through a duct, operating means associated with said damper for shifting the damper to varied positions of adjustment, and adjustable means associated with said operating means whereby the latter means may be caused to produce a greater or less degree of movement in the damper, said operating means comprising a cooperating worm and worm gear lever and said adjustable means including a link pivotally connected to said lever and selectively adjustable towards and away from the axis of the lever.

EMIL O. YOUNG.